(12) United States Patent
Mokuo et al.

(10) Patent No.: US 11,388,306 B2
(45) Date of Patent: Jul. 12, 2022

(54) IMAGE READING APPARATUS

(71) Applicant: SEIKO EPSON CORPORATION, Tokyo (JP)

(72) Inventors: Tomoyuki Mokuo, Kitakyushu (JP); Noriyuki Koyanagi, Kitakyushu (JP); Keiichiro Fukumasu, Kitakyushu (JP); Keisuke Miyauchi, Kitakyushu (JP); Naoki Sakamoto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/781,811

(22) Filed: Feb. 4, 2020

(65) Prior Publication Data

US 2020/0177760 A1 Jun. 4, 2020

Related U.S. Application Data

(63) Continuation of application No. 16/143,140, filed on Sep. 26, 2018, now Pat. No. 10,594,888.

(30) Foreign Application Priority Data

Sep. 27, 2017 (JP) .............................. JP2017-186947

(51) Int. Cl.
| *H04N 1/10* | (2006.01) |
| *H04N 1/12* | (2006.01) |
| *G06F 3/0488* | (2013.01) |
| *H04N 1/00* | (2006.01) |
| *G06F 3/04886* | (2022.01) |

(52) U.S. Cl.
CPC ........... *H04N 1/1008* (2013.01); *H04N 1/121* (2013.01); *G06F 3/04886* (2013.01); *H04N 1/001* (2013.01)

(58) Field of Classification Search
CPC ...... H04N 1/1008; H04N 1/121; H04N 1/001; H04N 1/12; G06F 3/04886
USPC .......................................................... 358/496
See application file for complete search history.

(56) References Cited

U.S. PATENT DOCUMENTS

| 6,788,440 | B1 | 9/2004 | Sashida | |
| 2002/0176121 | A1 | 11/2002 | Takei et al. | |
| 2003/0094751 | A1 | 5/2003 | Takei | |
| 2008/0111293 | A1* | 5/2008 | Shingai | H04N 1/00572 271/3.14 |
| 2008/0148968 | A1* | 6/2008 | Takahashi | B41L 39/00 101/118 |
| 2008/0203652 | A1 | 8/2008 | Yasukawa et al. | |

(Continued)

FOREIGN PATENT DOCUMENTS

| JP | 2002-354209 | 12/2002 |
| JP | 2003-209663 | 7/2003 |

(Continued)

*Primary Examiner* — Darryl V Dottin
(74) *Attorney, Agent, or Firm* — Workman Nydegger

(57) ABSTRACT

An image reading apparatus includes a separating roller that is capable of switching between a separation state in which an original document is separated and a non-separation state in which the original document is not separated, and determines whether or not the original document is fed in the separation state or the non-separation state based on the types of the original document set through a user interface for instructing a select of the types of the original document to be read and a start of reading the original document.

20 Claims, 14 Drawing Sheets

(56) References Cited

U.S. PATENT DOCUMENTS

| | | | | |
|---|---|---|---|---|
| 2014/0215374 A1* | 7/2014 | Nakao | ................ | H04N 1/00395 |
| | | | | 715/771 |
| 2016/0191734 A1 | 6/2016 | Yu | | |
| 2017/0126914 A1* | 5/2017 | Koyanagi | .......... | H04N 1/00779 |
| 2020/0272312 A1* | 8/2020 | Kanazawa | ............ | G06F 3/0482 |

FOREIGN PATENT DOCUMENTS

| | | |
|---|---|---|
| JP | 4820314 | 9/2011 |
| JP | 2012-041118 | 3/2012 |
| JP | 2012-188279 | 10/2012 |
| JP | 2014-065582 | 4/2014 |
| JP | 2016-127330 | 7/2016 |
| JP | 2016-141509 | 8/2016 |
| JP | 2017-085452 | 5/2017 |

\* cited by examiner

FIG. 6

| TABLE No. → | 1 | 2 | 3 | 4 |
|---|---|---|---|---|
| MODE | PANORAMIC PHOTOGRAPH | INSTANT PHOTOGRAPH | NORMAL PHOTOGRAPH | DOCUMENT |
| DOUBLE-FEEDING THRESHOLD | FOR PHOTOGRAPH | — | FOR PHOTOGRAPH | FOR DOCUMENT |
| DOUBLE-FEEDING DETECTION | ON | OFF | ON | ON |
| ONE SHEET OF PAPER FEEDING MODE | OFF | ON | OFF | OFF |
| SEPARATION MODE | SEPARATION | NON-SEPARATION | SEPARATION | SEPARATION |

IMAGE READING APPARATUS

BACKGROUND

1. Technical Field

The present invention relates to an image reading apparatus reading an original document.

2. Related Art

Hereinafter, a scanner which is an example of an image reading apparatus will be described as an example. In a scanner which is an example of an image reading apparatus, an automatic document feeder (also referred to as ADF) which automatically feeds an original document as a medium is provided, and the scanner may be configured to automatically feed and read a plurality of the original documents.

As a configuration of such a feeding device, as illustrated in Japanese Patent No. 4,820,314, a tray on which an original document is placed ("shooter 14" in Japanese Patent No. 4,820,314), a feeding roller ("setting roller 2" in Japanese Patent No. 4,820,314) which feeds the original document when coming into contact with a surface of the original document set in the tray and rotating, and a separating roller ("separating roller 12" in Japanese Patent No. 4,820,314) which separates the original document by coming into contact with the feeding roller are included.

The feeding roller disclosed in Japanese Patent No. 4,820,314 is configured to sequentially feed paper from paper on a lower side, that is, paper on a placing surface side of the tray among the plurality of the original documents (paper bundle) placed on the tray. The paper on an upper side, that is, paper to be separated is configured to be prevented from being fed to a downstream side when a distal end of the paper comes into contact with the separating roller.

However, there are various types of the original document, among the document types, there is an original document constituted by a plurality of layers, and this type of document may have a concern of being seriously damaged such as separation of layers when a separation force generated by the separating roller acts thereon in the same way as a general original document. As such an original document, for example, there is a film (hereinafter, also referred to as "instant film") being used for an instant camera.

However, a controller of the scanner is difficult to grasp that such an original document is set. In addition, also a user is difficult to grasp that serious damage occurs when such an original document is fed as it is in the same way as the other original documents.

SUMMARY

An advantage of some aspects of the invention is to appropriately feed an original document by reliably selecting an appropriate separation state in accordance with the types of the original document.

According to an aspect of the invention, there is provided an image reading apparatus including a reading unit that reads an original document, an original document placing portion on which the original document is placed, a feeding roller that feeds the original document from the original document placing portion, a separating roller that is a roller nipping the original document between the feeding roller and the separating roller and is capable of switching between a separation state in which the original document is separated and a non-separation state in which the original document is not separated, and a controller that controls feeding of the original document, in which the controller determines whether or not the original document is fed in the separation state or the non-separation state based on the types of the original document set through a user interface for instructing a select of the types of the original document to be read and a start of reading the original document.

In the configuration, the separating roller is capable of switching between the separation state in which the original document is separated and the non-separation state in which the original document is not separated, and the controller controlling the feeding of the original document determines whether or not the original document is fed in the separation state or the non-separation state based on the types of the original document set through the user interface for instructing a select of the types of the original document and a start of reading the original document, and thus it is possible to reliably select an appropriate separation state in accordance with the types of the original document and to appropriately feed the original document.

In addition, since a user does not need to select the separation state and the non-separation state of the separating roller because the user only instructs the select of the types of the original document P to be read and the start of reading the original document through the user interface, the apparatus is user-friendly and is capable of avoiding a setting mistake occurred by the user.

In the image reading apparatus, a switching unit that switches between the separation state and the non-separation state under the control of the controller may be further included, in which the controller may control the switching unit based on the types of the set original document.

In the configuration, the switching unit switching between the separation state and the non-separation state under the control of the controller is included, the controller controls the switching unit based on the types of the set original document, that is, the switching between the separation state and the non-separation state is automatically performed without touching of the user, and thus an operability of the user is improved.

In the image reading apparatus, a switching unit that switches between the separation state and the non-separation state by an operation of a user may be further included, in which the controller may generate an alert in a case in which a state of the separating roller does not correspond to the type of the set original document.

In the configuration, the switching unit switching between the separation state and the non-separation state by the operation of the user is included, the controller generates an alert in a case in which a state of the separating roller does not correspond to the type of the set original document, and thus it is possible to urge a user to perform a correct operation and to perform feeding of the original document.

In the image reading apparatus, a double-feeding detecting portion that detects double-feeding of the original document on the downstream side of the feeding roller, may be further included, in which the controller may be capable of switching between a first feeding mode in which a first original document is fed and a second feeding mode in which a second original document is fed, the first feeding mode may be a mode in which a state of the separating roller is set to the non-separation state and the original document is fed, the second feeding mode may be a mode in which the state of the separating roller is set to the separation state and the original document is fed, and the controller may not use the double-feeding detecting portion in the first feeding mode but use the double-feeding detecting portion in the second feeding mode.

The original document fed by setting the separating roller to the non-separation state may be constituted by a plurality of layers, and if the double-feeding detecting portion detecting the double-feeding of the original document is used, there is a concern that the double-feeding may be determined in spite of non double-feeding and a job is stopped.

In the configuration, the controller does not use the double-feeding detecting portion in the first feeding mode set to the non-separation state but uses the double-feeding detecting portion in the second feeding mode set to the separation state, and thus it is possible to avoid the concern described above.

In addition, it is possible to appropriately feed the original documents constituted by the plurality of layers, that is, the original documents in which a damage may be generated when being separated by the separating roller in first feeding mode.

In the image reading apparatus, the first feeding mode may be a feeding mode in which only one sheet of the original documents set in the original document placing portion is fed and a feeding standby state is set until a next one sheet of the original documents is set, and the second feeding mode may be a feeding mode in which a plurality of original documents set in the original document placing portion is separated by the separating roller and is continuously fed.

In the configuration, it is possible to appropriately feed the original documents constituted by the plurality of layers, that is, the original documents in which a damage may be generated when being separated by the separating roller in first feeding mode.

BRIEF DESCRIPTION OF THE DRAWINGS

The invention will be described with reference to the accompanying drawings, wherein like numbers reference like elements.

FIG. 6 is a condition table illustrating a feeding condition of each type of the original document.

DESCRIPTION OF EXEMPLARY EMBODIMENTS

Hereinafter, an embodiment of an image reading apparatus according to the invention will be described. As an example of the image reading apparatus in the embodiment, a document scanner (hereinafter, simply referred to as scanner 1) which is capable of reading at least one surface of a front surface and a rear surface of an original document which is an example of a medium is exemplified.

Figure 1:
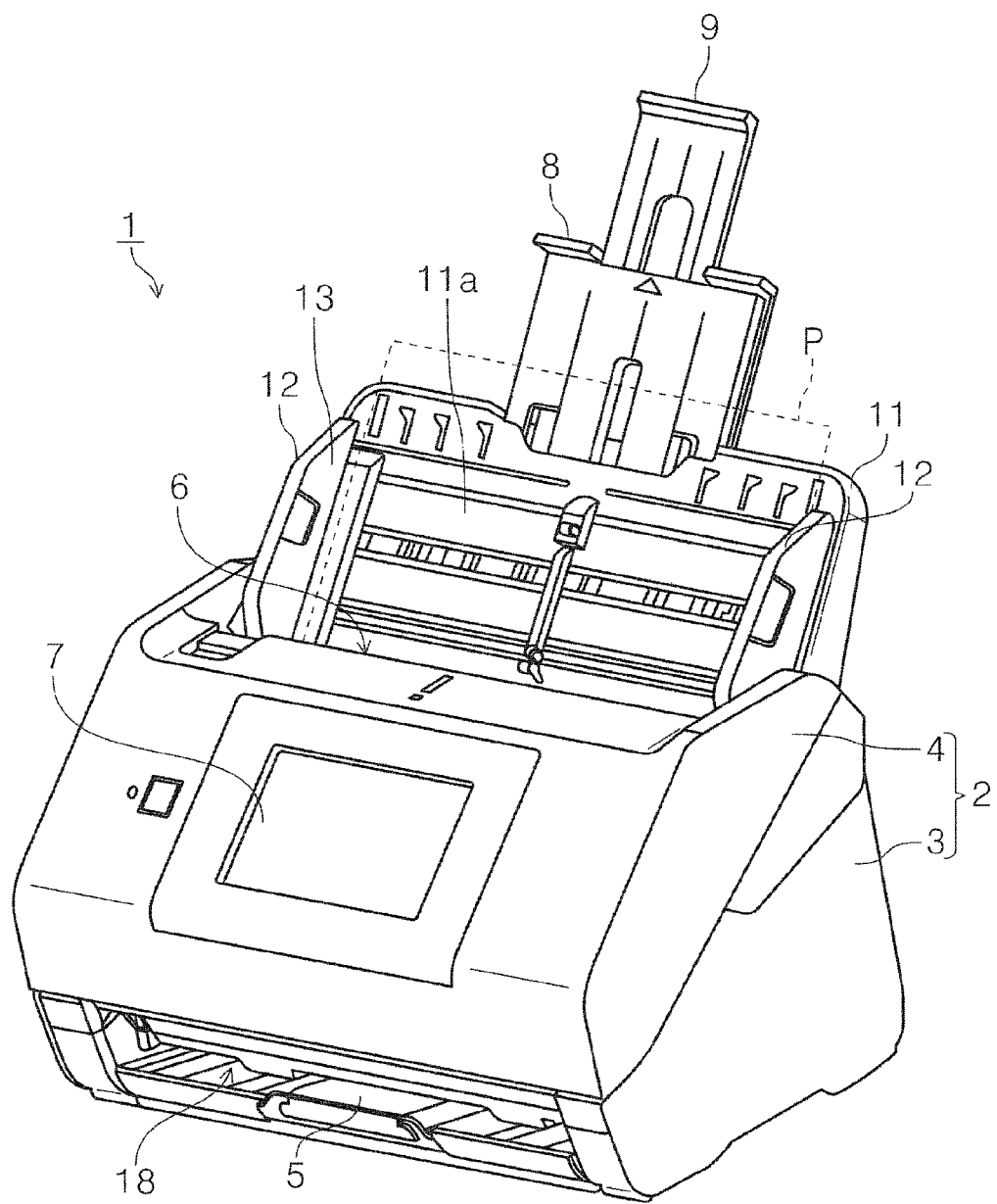
FIG. 1 is an exterior perspective view illustrating a scanner according to the invention.
Figure 1:
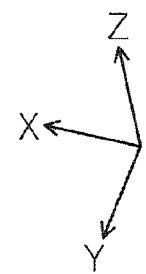
Figure 2:
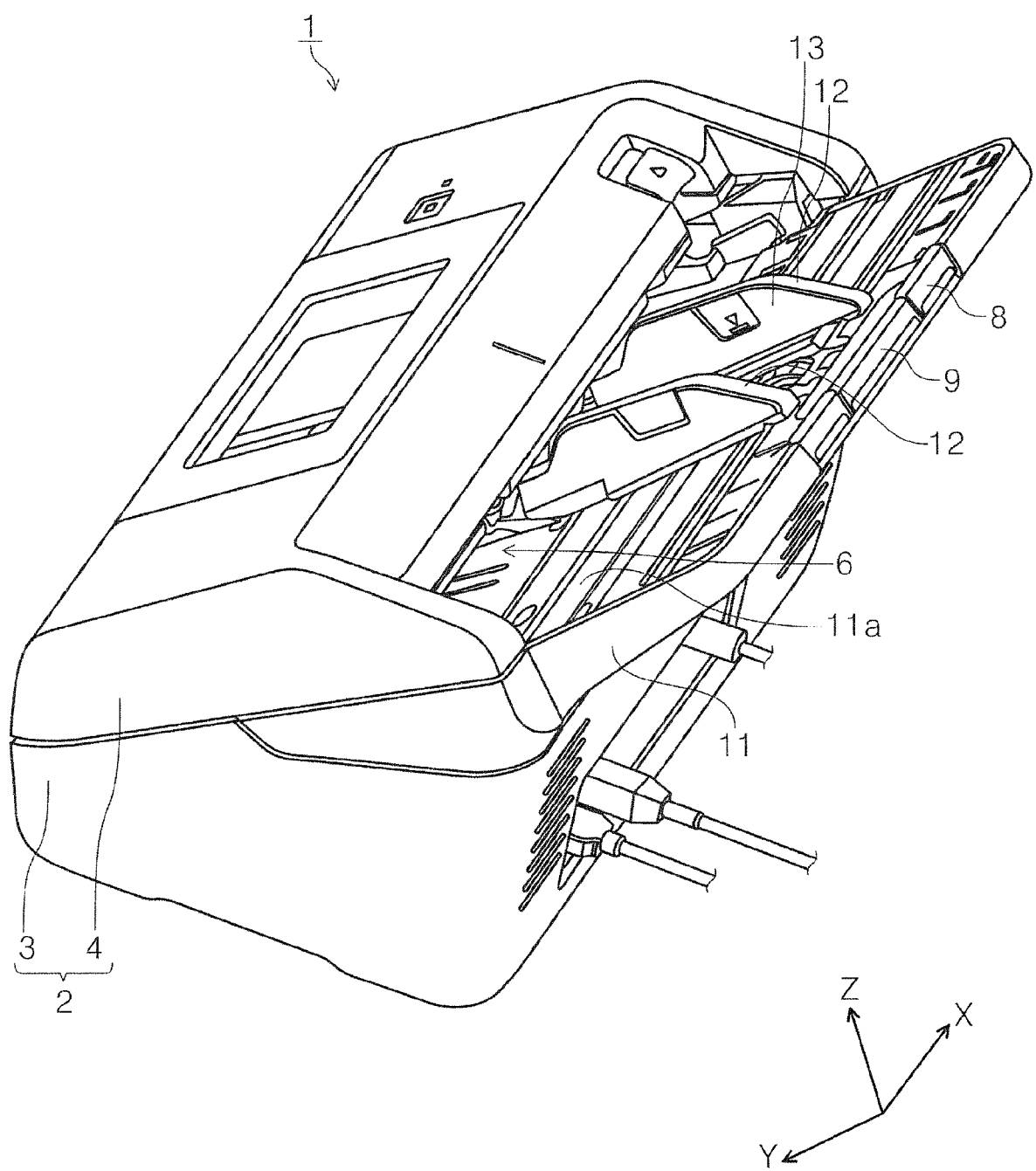
FIG. 2 is a perspective view illustrating the scanner according to the invention when seen from a different angle from FIG. 1.
Figure 3:
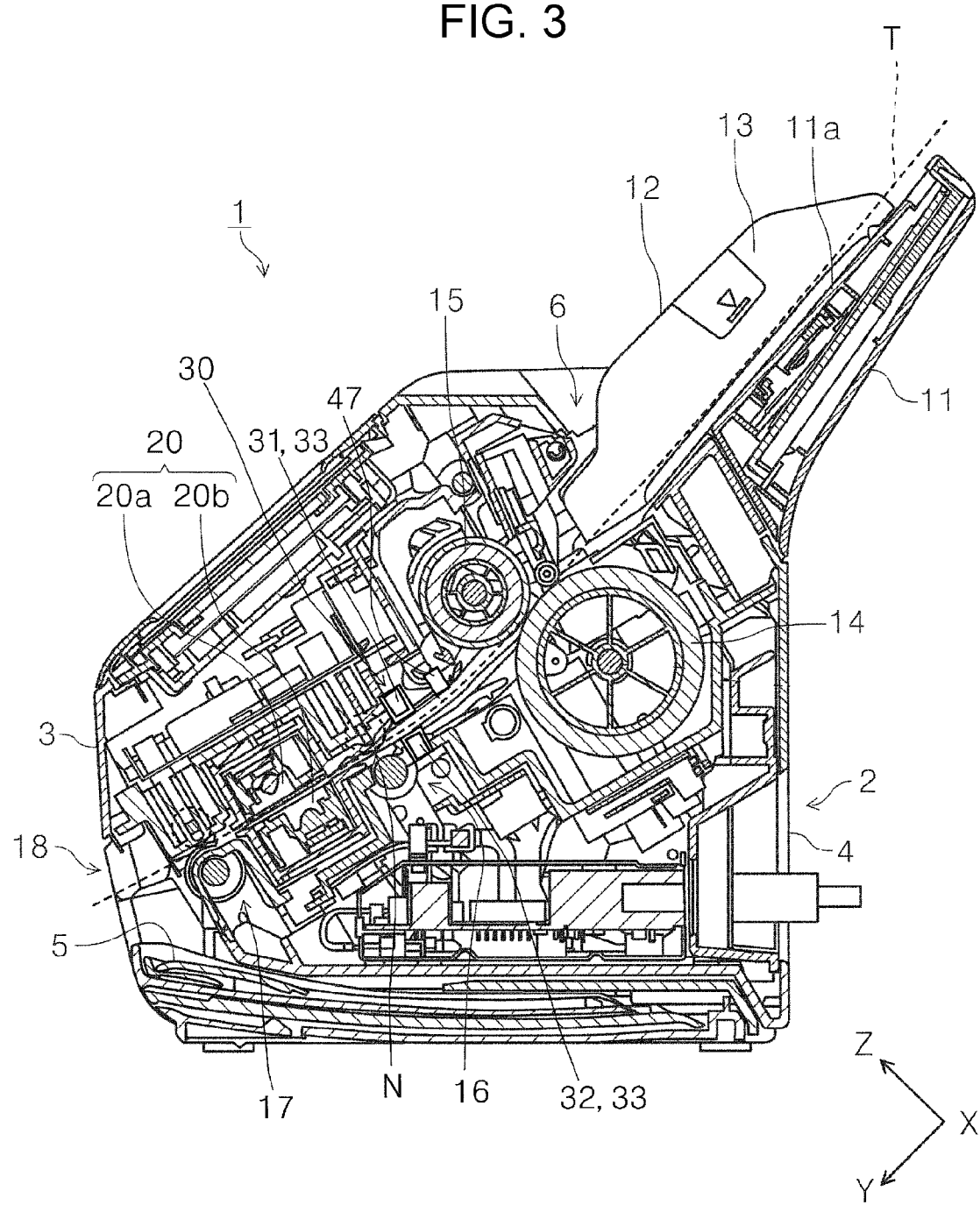
FIG. 3 is a side sectional view illustrating an original document transporting path in the scanner according to the invention.
Figure 4:
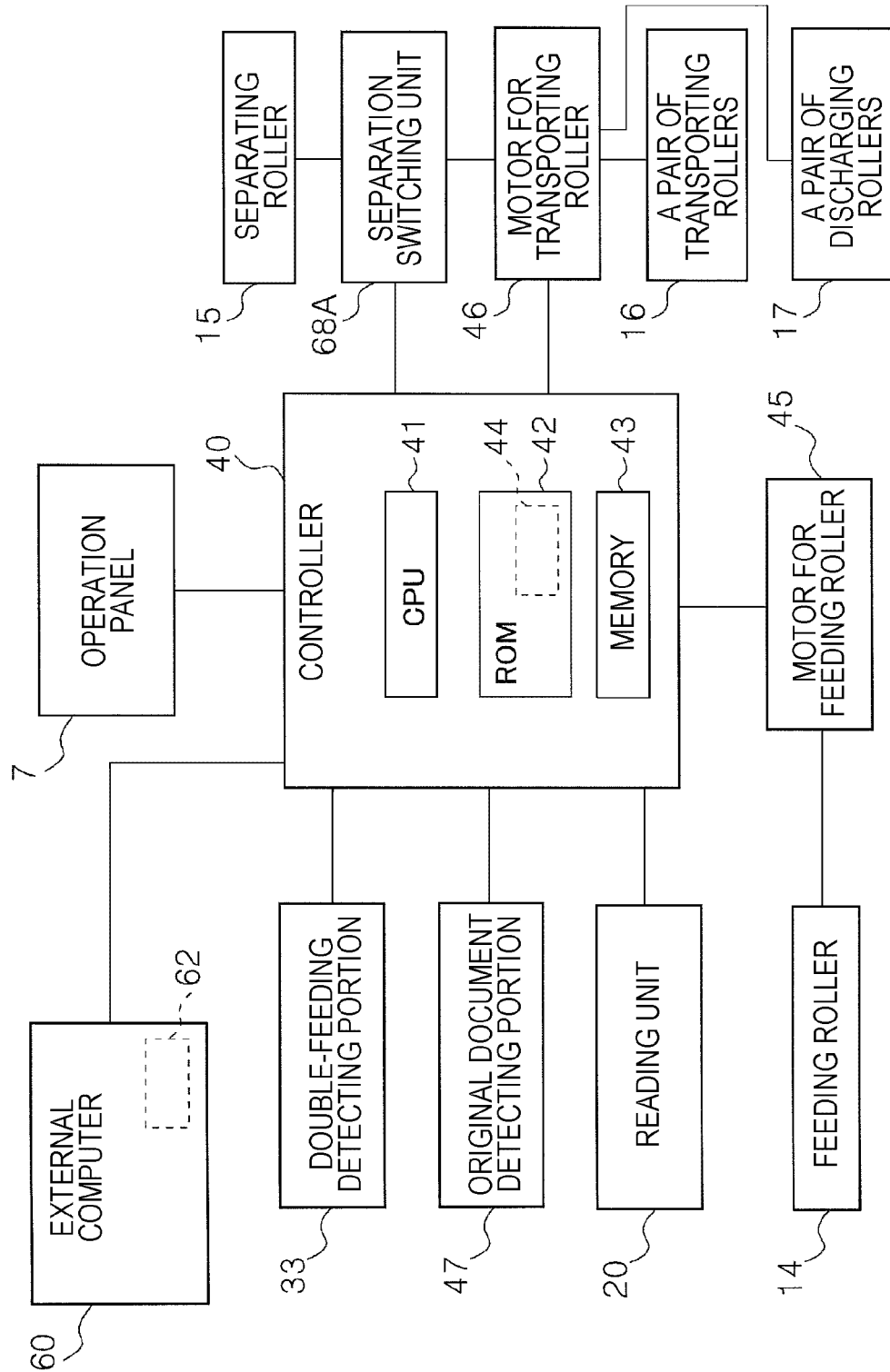
FIG. 4 is a block diagram illustrating a control system of the scanner according to the invention.
Figure 5:
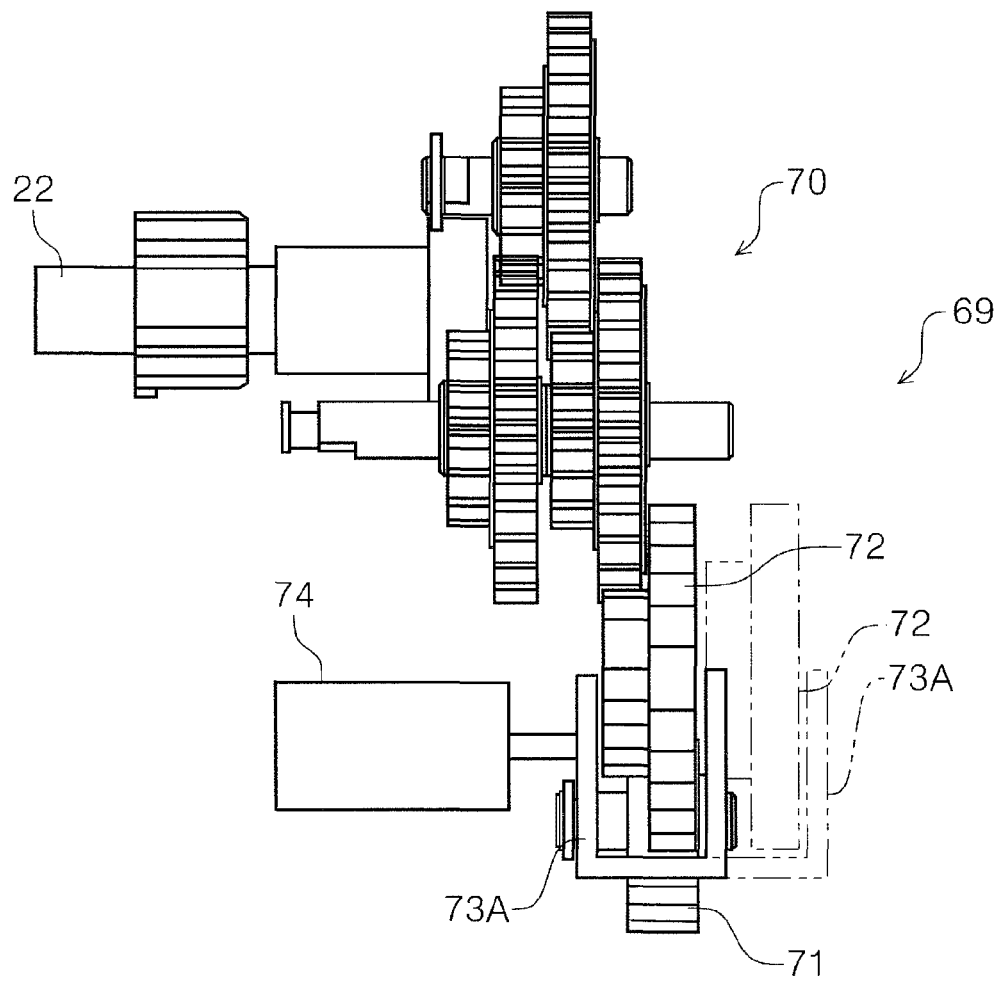
FIG. 5 is a plan view of a switching unit which switches between a separation state and a non-separation state of a separating roller.

FIG. 1 is an exterior perspective view illustrating a scanner according to the invention, FIG. 2 is a perspective view of the scanner according to the invention when seen at a different angle from FIG. 1, FIG. 3 is a side sectional view illustrating an original document transporting path in the scanner according to the invention, FIG. 4 is a block diagram illustrating a control system of the scanner according to the invention, and FIG. 5 is a plan view of a switching unit which switches between a separation state and a non-separation state of a separating roller.

Figure 7:
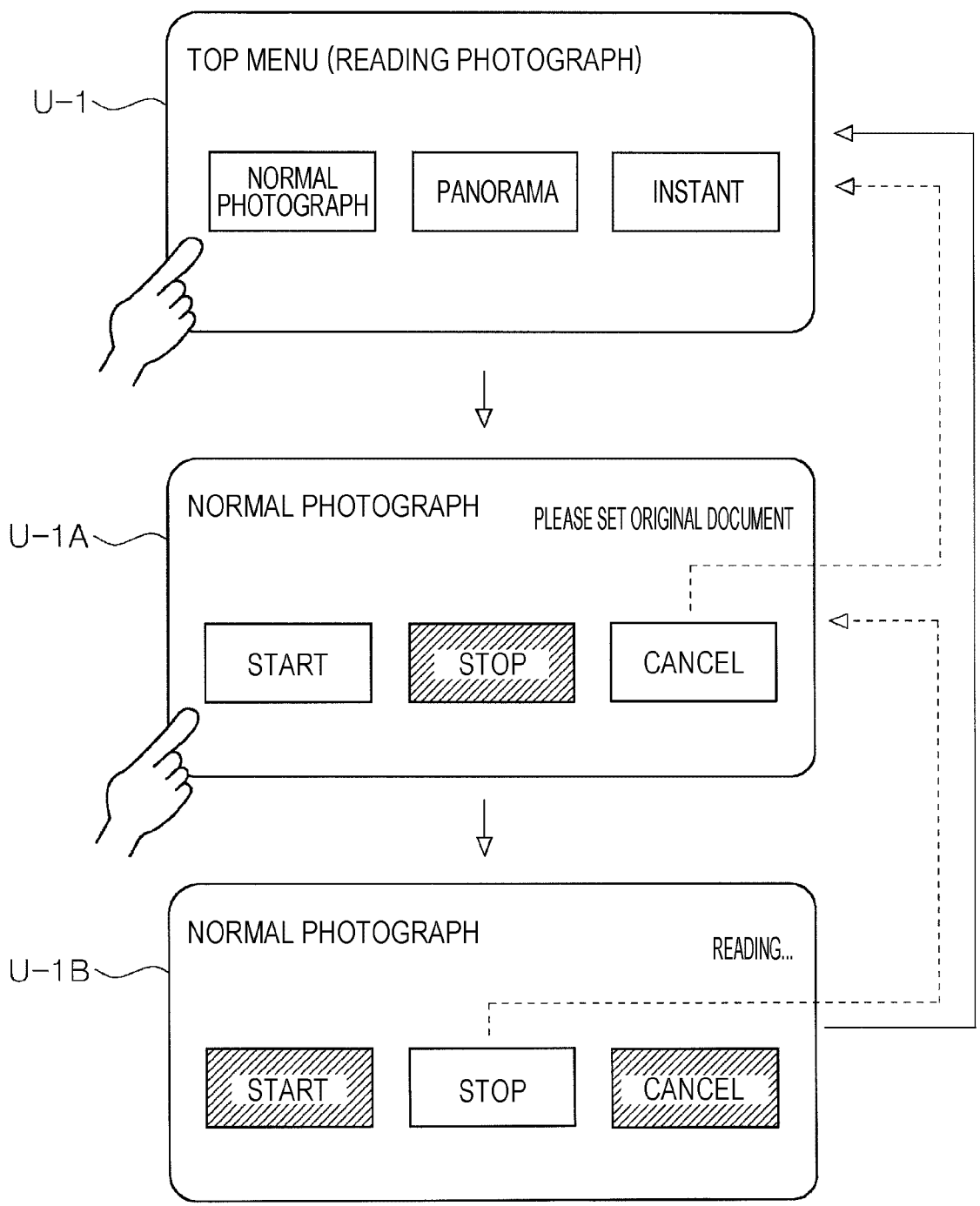
FIG. 7 is a diagram illustrating a transition example of a user interface at the time of reading a normal photograph.
Figure 8:
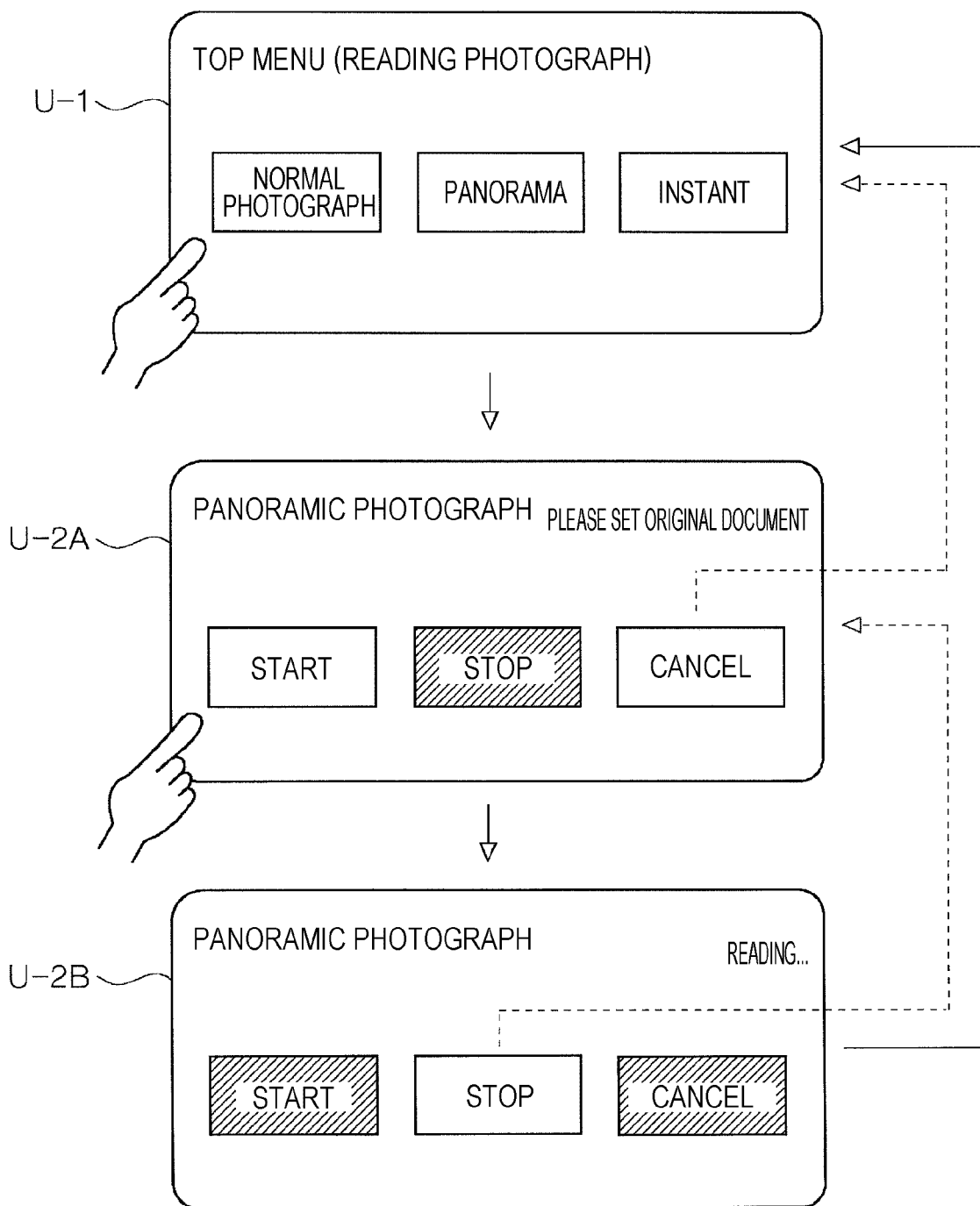
FIG. 8 is a diagram illustrating a transition example of the user interface at the time of reading a panoramic photograph.
Figure 9:
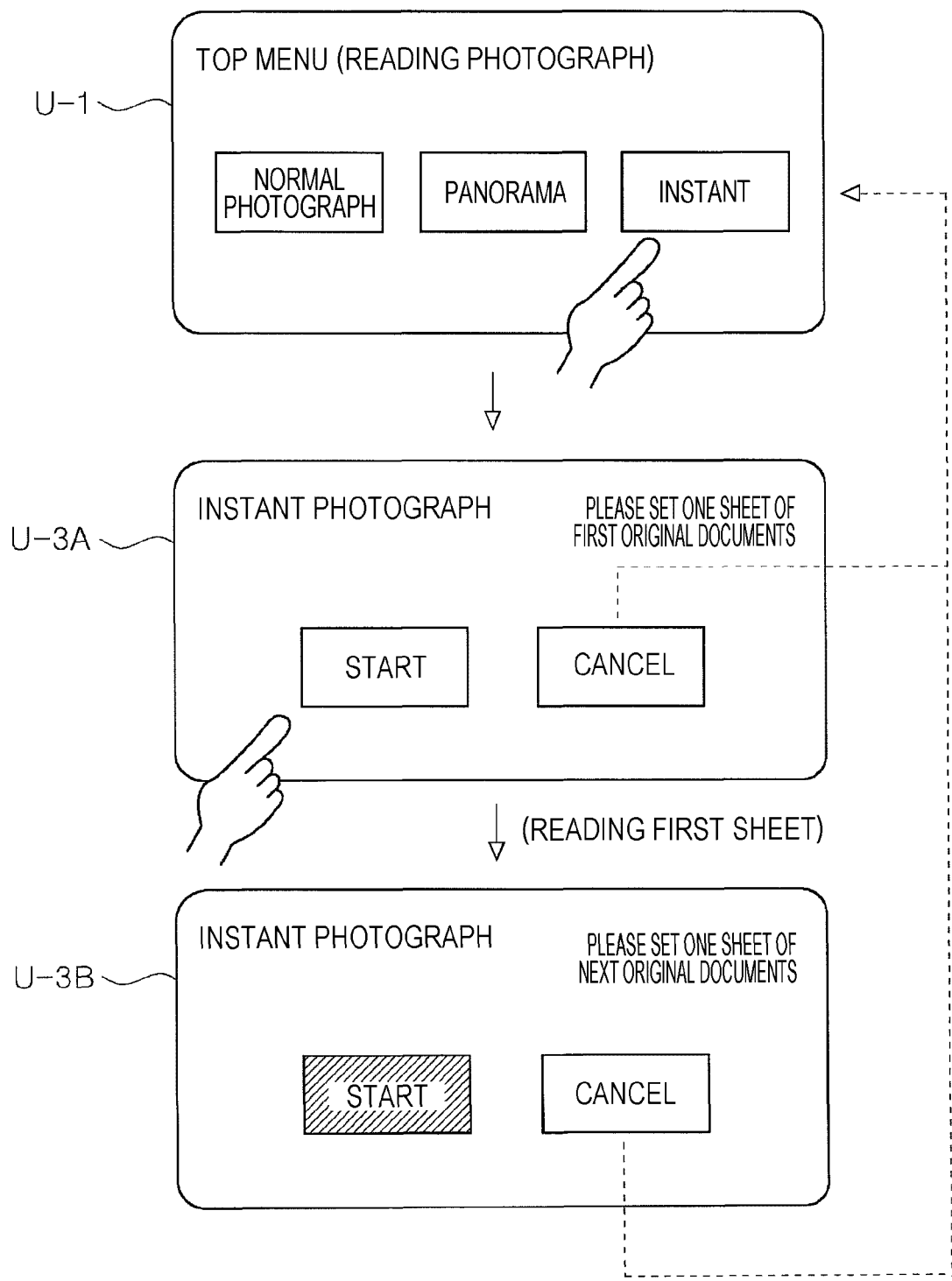
FIG. 9 is a diagram illustrating a transition example of the user interface at the time of reading an instant photograph.
Figure 10:
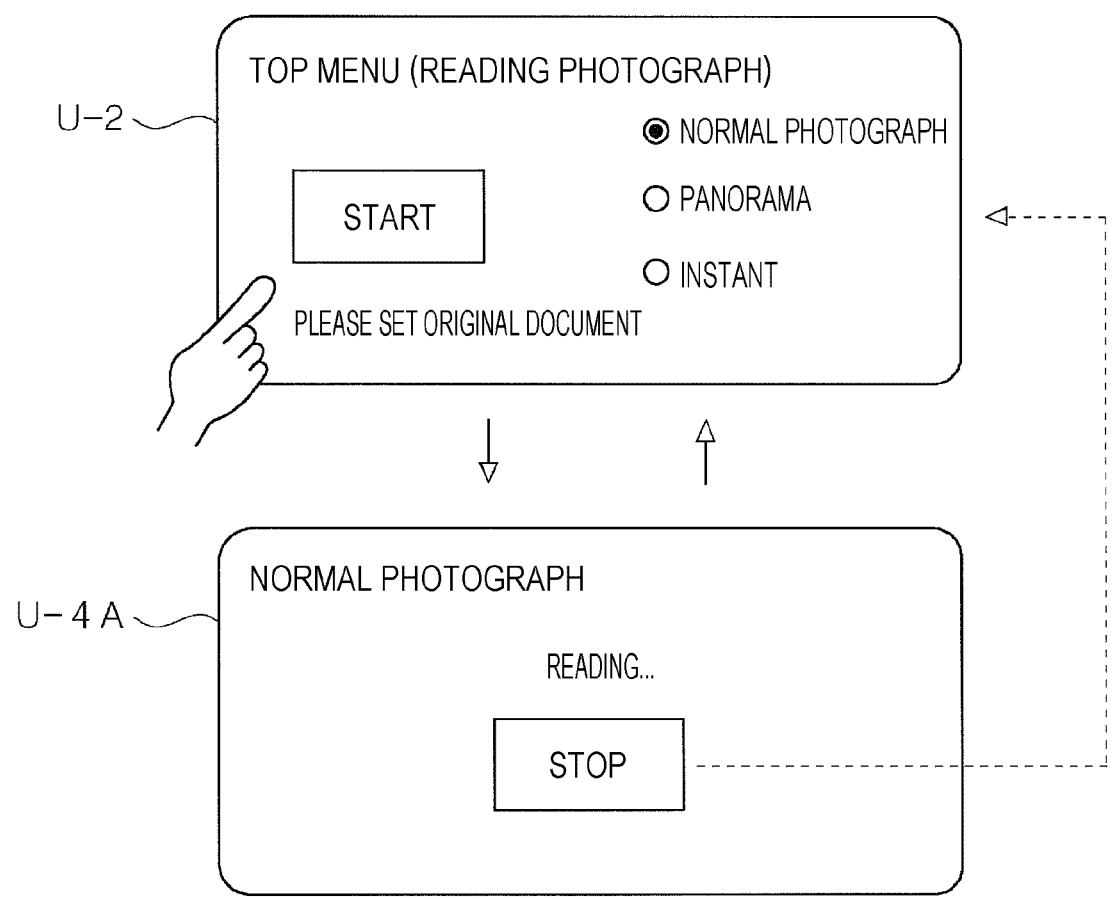
FIG. 10 is a diagram illustrating the transition example of the user interface at the time of reading the normal photograph.
Figure 11:
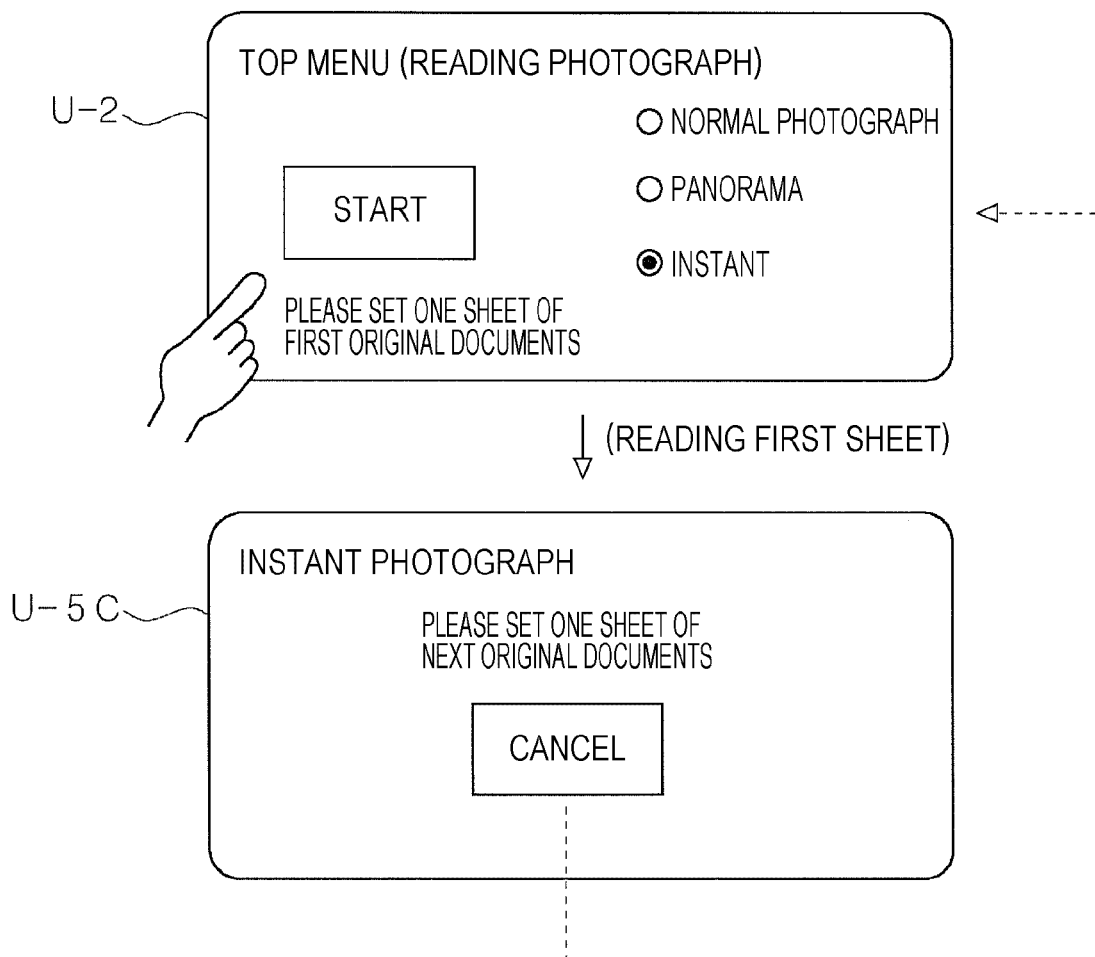
FIG. 11 is a diagram illustrating the transition example of the user interface at the time of reading the instant photograph.

In addition, FIG. 6 is a condition table illustrating a feeding condition of each type of the original document, FIG. 7 is a diagram illustrating a transition example of a user interface at the time of reading a normal photograph, FIG. 8 is a diagram illustrating a transition example of the user interface at the time of reading a panoramic photograph, FIG. 9 is a diagram illustrating a transition example of the user interface at the time of reading an instant photograph, FIG. 10 is a diagram illustrating the transition example of the user interface at the time of reading the normal photograph, and FIG. 11 is a diagram illustrating the transition example of the user interface at the time of reading the instant photograph.

Figure 12:
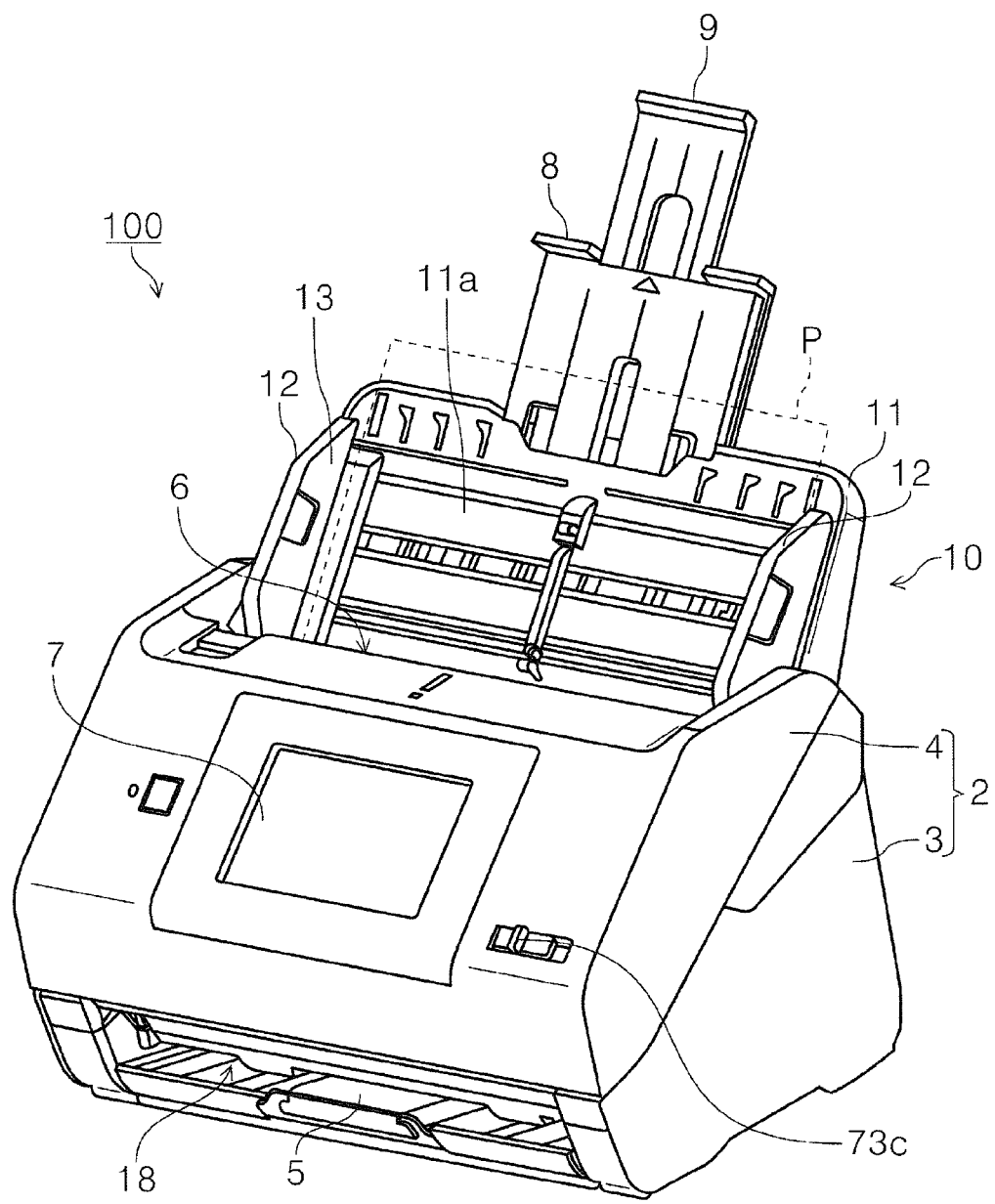
FIG. 12 is an exterior perspective view illustrating a scanner according to the invention (second embodiment).
Figure 13:
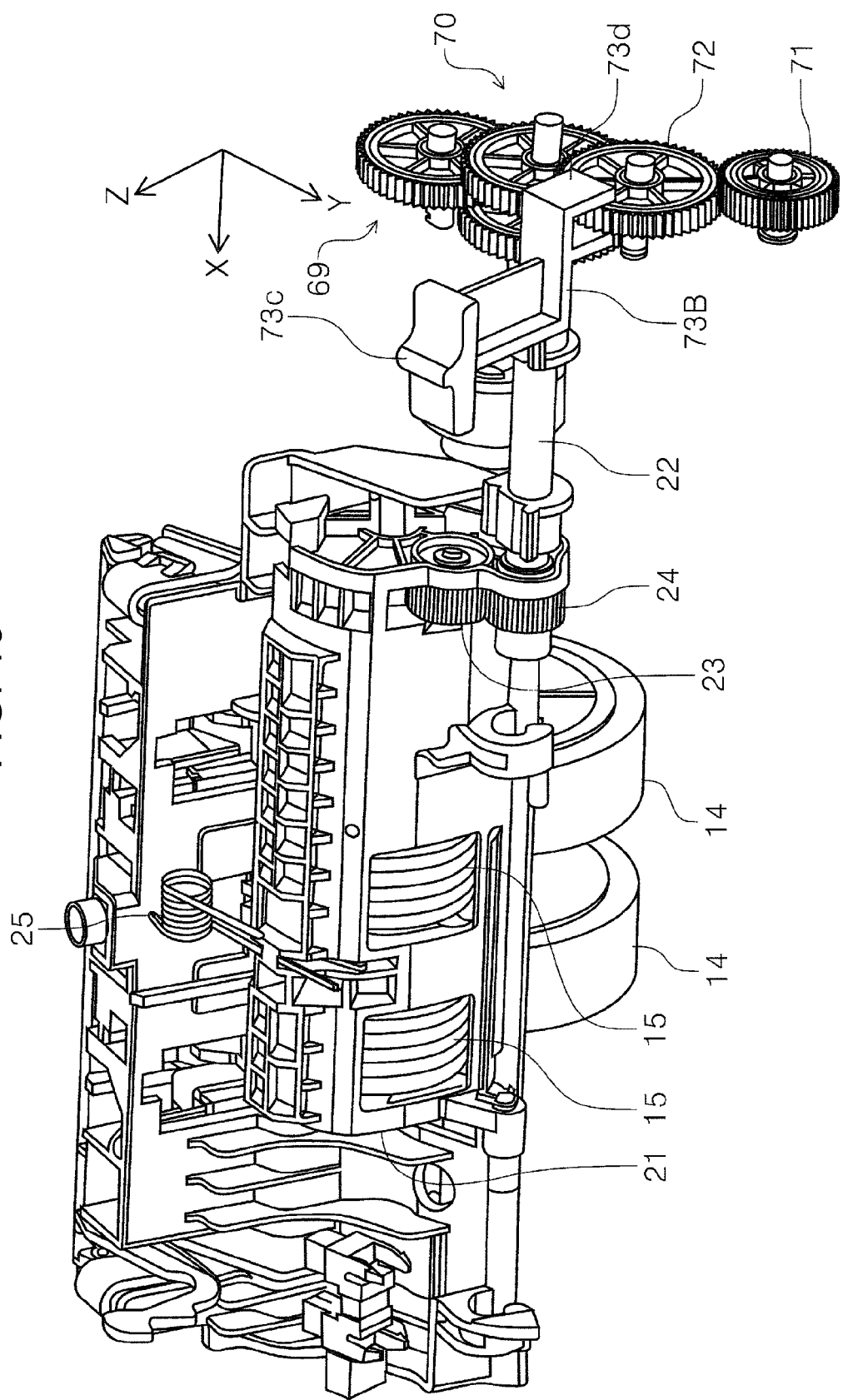
FIG. 13 is an exterior perspective view illustrating a switching unit which switches between a separation state and a non-separation state of a separating roller (second embodiment).
Figure 14:
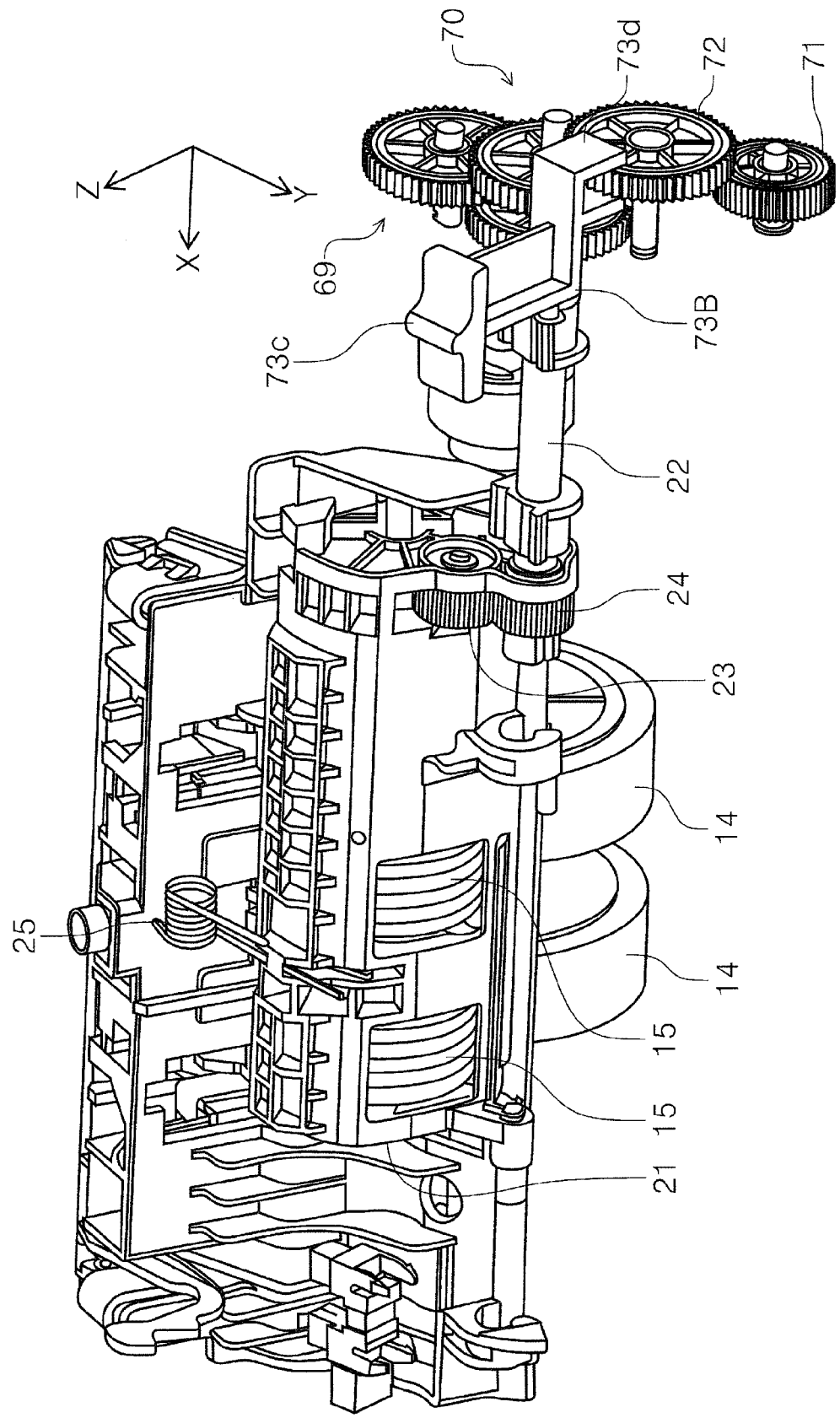
FIG. 14 is an exterior perspective view illustrating the switching unit which switches between the separation state and the non-separation state of the separating roller (second embodiment).

In addition, FIG. 12 is an exterior perspective view illustrating a scanner according to the invention (second embodiment), FIGS. 13 and 14 are perspective views of the switching unit which switches between the separation state and the non-separation state of the separating roller (second embodiment).

Also, regarding an X-Y-Z coordinate system illustrated in each drawing, an X direction indicates an original document width direction which is an apparatus width direction, and a Y direction indicates an original document transporting direction. A Z direction indicates a direction intersecting the Y direction and substantially orthogonal to a surface of the original document being basically transported. In addition, a +Y direction side is set to a front surface side of the apparatus, and a −Y direction side is set to a rear surface side of the apparatus. In addition, a left side seen from the front surface side of the apparatus is set to a +X direction, and a right side is set to a −X direction. In addition, a +Z direction is set to an upper side (including upper portion, upper surface, and the like) of the apparatus, and a −Z direction side is set to a lower side (including lower portion, lower surface, and the like) of the apparatus. In addition, a direction (+Y direction side) where an original document P is fed is set to a "downstream", and an opposite direction thereof (−Y direction side) is set to an "upstream".

Outline of Scanner

Hereinafter, a scanner 1 according to the invention will be described mainly with reference to FIGS. 1 and 2.

The scanner 1 illustrated in FIG. 1 includes an apparatus main body 2 in which a reading unit 20 (FIG. 3) reading an image of an original document P is included.

The apparatus main body 2 is configured with a lower portion 3 and an upper portion 4. The upper portion 4 is attached to be openable and closable based on a downstream side of the lower portion 3 in a paper transporting direction as a rotation fulcrum, the upper portion 4 is opened by being rotated on the front surface side of the apparatus, and a paper jam process of the original document P is easily performed by exposing an original document transporting path of the original document P.

An original document placing portion 11 including a placing surface 11a on which the original document P to be fed is placed is provided on a rear surface side of the apparatus (−Y axis direction side) of the apparatus main body 2. The original document placing portion 11 is provided to be detachable from the apparatus main body 2.

In addition, a pair of right and left edge guides 12 and 12 including a guide surface 13 guiding a side edge in a width direction (X axis direction) intersecting a feeding direction (Y axis direction) of the original document P is provided on the original document placing portion 11.

The original document placing portion 11 includes a first paper support 8 and a second paper support 9. The first paper support 8 and the second paper support 9 can be accommodated inside the original document placing portion 11 as illustrated in FIG. 2 and can be pulled out from the original document placing portion 11 as illustrated in FIG. 1, and a length of the placing surface 11a can be adjusted.

The apparatus main body 2 includes an operation panel 7, which realizes the user interface (UI) performing various reading settings or operations for reading, or displaying contents of reading settings or the like, on a front surface side of the apparatus of the upper portion 4. The operation panel 7 is a so-called touch panel through which both displaying and inputting in the embodiment are performed.

A feeding port 6 connected to an inside of the apparatus main body 2 is provided on the upper portion 4, and the original document P placed on the original document placing portion 11 is fed toward a reading unit 20, which is provided inside the apparatus main body 2, from the feeding port 6.

In addition, a discharging tray 5 to be described later is provided on the front surface side of the apparatus of the lower portion 3.

Original Document Transporting Path in Scanner

Next, with reference to FIG. 3, an original document transporting path in the scanner 1 will be described. Also, a dotted line illustrated by a reference number T in FIG. 3 indicates the original document transporting path.

A feeding roller 14, which feeds the original document P placed on the placing surface 11a of the original document placing portion 11 toward the reading unit 20, and a separating roller 15, which nips and separates the original document P between the feeding roller 14 and the separating roller, are provided on a downstream side of the original document placing portion 11.

The original document P placed on the placing surface 11a of the original document placing portion 11 is fed to the downstream side (+Y direction side) by the feeding roller 14 provided to be rotatable with respect to the lower portion 3. Therefore, in a case in which a plurality of original documents P in the scanner 1 is set on the original document placing portion 11, the original documents P are sequentially fed toward the downstream side from the document on the placing surface 11a side.

Also, a sensor (not illustrated) which detects whether or not the original document P is present or absent on the original document placing portion 11 is provided on the original document placing portion 11.

The feeding roller 14 is rotary-driven by a motor 45 for a feeding roller (FIG. 4). A rotation torque is obtained from the motor 45 for the feeding roller, and the feeding roller 14 is rotated in a counterclockwise direction in a FIG. 3.

The rotation torque is transmitted to the separating roller 15 through a torque limiter, which is not illustrated, from a motor 46 for a transporting roller (FIG. 4).

In a case in which the original document P is not interposed between the feeding roller 14 and the separating roller 15 or only one sheet of the original documents is interposed therebetween, the separating roller 15 is driven and rotated regardless of the rotation torque received from the motor 46 for the transporting roller when slip occurs in the torque limiter which is not illustrated (in clockwise direction in FIG. 3).

When original documents P subsequent to a second sheet of the documents are entered between the feeding roller 14 and the separating roller 15 with the original document P to be fed, the slip occurs between the original documents, and the separating roller 15 is rotated in the counterclockwise direction in FIG. 3 by receiving the rotation torque from the motor 46 for the transporting roller. Therefore, double-feeding of the original document P is prevented.

Also, a driving force transmission path from the motor 46 for the transporting roller to the separating roller 15 is provided in a separation switching unit 68A (FIGS. 4 and 5), but the driving force transmission path will be described later.

A pair of transporting rollers 16, the reading unit 20 reading an image, and a pair of discharging rollers 17 are provided on the downstream side of the feeding roller 14. The original document P, which is nipped between the feeding roller 14 and the separating roller 15 and is fed to the downstream side, is nipped by the pair of transporting rollers 16 and is transported to the reading unit 20 positioned on the downstream side of the pair of transporting rollers 16.

The pair of transporting rollers 16 is rotary-driven by the motor 46 for the transporting roller (FIG. 4).

An ultrasonic transmitting portion 31 and an ultrasonic receiving portion 32 constituting a double-feeding detecting portion 33 are provided on the original document transporting path between the feeding roller 14 and the reading unit 20. More specifically, the double-feeding detecting portion 33 includes the ultrasonic transmitting portion 31 which transmits ultrasonic waves, and the ultrasonic receiving portion 32 which receives the ultrasonic waves transmitted from the ultrasonic transmitting portion 31 and outputs a detecting signal in accordance with the received ultrasonic waves.

The ultrasonic transmitting portion 31 and the ultrasonic receiving portion 32 are provided on an upper side and a lower side pinching the original document transporting path. More specifically, the ultrasonic transmitting portion 31 is provided on an upper portion 4 side, and the ultrasonic receiving portion 32 is provided on a lower portion 3 side.

The double-feeding detecting portion 33 is capable of detecting double-feeding of the original document P to be transported, or a folded or wrinkled original document P, or the like.

The reading unit 20 includes an upper portion reading sensor 20a provided on the upper portion 4 side and a lower portion reading sensor 20b provided on the lower portion 3 side. In the embodiment, the upper portion reading sensor 20a and the lower portion reading sensor 20b are configured as a contact type image sensor module (CISM) as an example.

Also, an original document detecting portion 47 which detects passing of a distal end or a rear end of the original document P is provided between the double-feeding detecting portion 33 on the original document transporting path and the feeding roller 14. A controller 40 of the scanner 1 is capable of easily grasping a position of the original document P on the original document transporting path based on a signal transmitted from the original document detecting portion 47.

After the reading unit 20 reads an image on at least one surface of the front surface and the rear surface of the original document P, the original document P is nipped between the pair of discharging rollers 17 positioned on the downstream side of the reading unit 20, and is discharged from a discharging port 18 provided on the front surface side of the apparatus of the lower portion 3.

Also, the pair of discharging rollers 17 is rotary-driven by the motor 46 for the transporting roller (FIG. 4).

The discharging tray 5, which is configured to be capable of being pulled out from the discharging port 18 toward the front surface side of the apparatus, is provided on the lower portion 3. The discharging tray 5 is set in a state of being accommodated in a bottom portion of the lower portion 3 (FIG. 1) and a state of being pulled out to the front surface side of the apparatus which is not illustrated. In a state in which the discharging tray 5 is pulled out, the original document P discharged from the discharging port 18 can be loaded on the discharging tray 5.

Regarding Control System in Scanner

In FIG. 4, the controller 40 performs various controls of the scanner 1 including a feeding control of the original document P. A signal from the operation panel 7 is input to the controller 40, and a signal for a display of the operation panel 7, particularly, for realizing the user interface (UI) is transmitted to the operation panel 7 from the controller 40.

The controller 40 controls the motor 45 for the feeding roller and the motor 46 for the transporting roller. The motor 45 for the feeding roller as described above is a driving source of the feeding roller 14, and the motor 46 for the transporting roller is a driving source of the separating roller 15, the pair of transporting rollers 16, and the pair of discharging rollers 17.

Data to be read by the reading unit 20 is input to the controller 40, and a signal for controlling the reading unit 20 is transmitted to the reading unit 20 from the controller 40.

Signals from the double-feeding detecting portion 33 and the original document detecting portion 47 are input to the controller 40.

The controller 40 includes a CPU 41, a ROM 42, and a memory 43. The CPU 41 performs various calculations according to a control program stored in the ROM 42, and controls the entire operations of the scanner 1. Also, each data item need for detecting of the double-feeding is stored in the memory 43 which is an example of a storage is a nonvolatile memory capable of reading and writing.

A control program 44 for controlling feeding of the original document P is stored in the ROM 42 according to an example of the invention (details will be described later).

In addition, the scanner 1 is configured to be capable of coming into contact with an external computer 60, and information is input to the controller 40 from the external computer 60. The external computer 60 includes a displaying portion 62. The control program stored in a storage unit which is not illustrated realizes the user interface (UI) in the displaying portion 62.

In addition, the controller 40 controls the separation switching unit 68A provided on a power transmission path from the motor 46 for the transporting roller to the separating roller 15. Hereinafter, with reference to FIG. 5, the separation switching unit 68A will be described.

A referent number 22 in FIG. 5 indicates a transmission shaft which transmits a driving force from the motor 46 for the transporting roller to the separating roller 15, and the driving force from the motor 46 for the transporting roller is transmitted to the transmission shaft 22 through a driving gear 71, a slide gear 72, and a gear group 70.

The driving gear 71, the slide gear 72, the gear group 70, the transmission shaft 22, and the separation switching unit 68A to be described later constitute the power transmitting mechanism 69 transmitting the driving force from the motor 46 for the transporting roller to the separating roller 15.

The slide gear 72 is provided to be slidable in a rotation axial direction (right and left direction of FIG. 5), and when the slide gear slides, a state thereof can be changed to a state in which the driving power is transmitted to the gear group 70 by meshing with the driving gear 71 (illustrated by solid line) and a state in which the driving force is not transmitted to the gear group 70 deviated from the driving gear 71 (illustrated by two-dot chain line). Hereinafter, a state in which the driving force is transmitted to the gear group 70 from the driving gear 71, that is, a state in which the driving force of the motor 46 for the transporting roller is transmitted to the separating roller 15 is referred to a "separation state" of separating the original document P. In addition, the state in which the driving force is not transmitted to the gear group 70 from the driving gear 71, that is, the state in which the driving force of the motor 46 for the transporting roller is not transmitted to the separating roller 15 is referred to a "non-separation state" of not separating the original document P. The non-separation state is a state in which the separating roller 15 can be freely rotated with a weak force.

The separation switching unit 68A switches between the separation state and the non-separation state. The separation switching unit 68A includes an electromagnetic plunger 74 and a gear engaging member 73A when being displaced in the right and left direction of FIG. 5 by the electromagnetic plunger 74. The gear engaging member 73A is formed in a shape of pinching the slide gear 72, and because of an operation of the electromagnetic plunger 74, the slide gear 72 is displaced, and the separation state and the non-separation state are switched.

Feeding Control in Scanner

Continuously, with reference to drawings subsequent to FIG. 6, a feeding control to be switched in accordance with the types of the original document will be described.

The control program 44 (FIG. 4) included in the controller 40 is executed for realizing the user interface (UI) illustrated in FIGS. 7 to 9, or FIGS. 10 and 11. The user interface illustrated in FIGS. 7 to 9, or FIGS. 10 and 11 is a user interface to be realized on the operation panel 7 and is an operation menu for performing reading.

An operation menu U-1 in FIG. 7 is an operation menu to be realized at the time of reading various photographs which are an example of the original document P. Also, the operation menu U-1 is an operation menu to be realized in a case in which a photograph is selected in the operation menu, which is not illustrated, in which whether or not the photograph is read or a document is read is selected.

In the example, as the types of a photograph, these three types of a "normal photograph", a "panoramic photograph", and an "instant photograph" can be set to be selectable. The instant photograph is constituted a plurality of layers such as a photograph of polaroid (registered trademark of Polaroid Corporation) and is a photograph having a concern of damage in which the layers may be separated when the separating roller 15 performs separation in the separation state.

In a case in which the "normal photograph" is selected in the operation menu U-1 as illustrated in FIG. 7, a process is transitioned to the operation menu U-1A. In the operation menu U-1A, a guide of "Please set original document" is displayed, three operation icons of "start", "stop", and "cancel" are displayed, and the "stop" icon is set to be not selectable.

When the "cancel" is selected in the operation menu U-1A, the process returns to the operation menu U-1. When the "start" icon is selected in the operation menu U-1A, the process is transitioned to an operation menu U-1B, and a normal photograph starts to be fed and read.

In the operation menu U-1B, a guide of "reading" is displayed, and the "start" and the "cancel" icons are set to be not selectable. When the "stop" is selected in the operation menu U-1B, reading is stopped, and the process returns to the operation menu U-1A. When the reading is stopped without selecting the "stop" icon in the operation menu U-1B, the process returns to the operation menu U-1.

The "cancel" icon may be omitted in the operation menus U-1A and U-1B.

Also, in a case in which "normal photograph" is selected in the operation menu U-1, the controller 40 selects a table No. 3 of FIG. 6 as a feeding condition to be applied when the original document P is fed.

"Double-feeding detecting threshold" in FIG. 6 is a threshold used for determining whether or not the double-feeding occurs or not based on a signal level obtained by the double-feeding detecting portion 33, and since the signal level decreases as a thickness of the original document is thickened, the threshold also decreases. Here, a threshold "for photograph" is used.

In addition, "ON" selected as "double-feeding detection" indicates that double-feeding is determined, and "OFF" indicates that the double-feeding is not determined. Here, when "ON" is set, the double-feeding is determined.

"One sheet of paper feeding mode" is a paper feeding mode in which the paper is set one by one and is fed without setting a plurality of the original documents P, and "ON" indicates applying of the mode, and "OFF" indicates not applying of the mode. Here, when "OFF" is set, the plurality of original documents P can be set, and the documents are sequentially fed from the lowest document among the plurality of set original documents.

"Separation mode" indicates either of the separation state and the non-separation state of the separating roller 15. Here, when "separation" is set, and the separating roller 15 is set in the separation state and separates the original documents.

Next, in a case in which "panorama" is selected in the operation menu U-1 as illustrated in FIG. 8, the process is transitioned to an operation menu U-2A. In the operation menu U-2A, a guide of "Please set original document" is displayed, the three operation icons of "start", "stop", and "cancel" are displayed, and the "stop" icon is set to be not selectable.

When "cancel" is selected in the operation menu U-2A, the process returns to the operation menu U-1. When "start" is selected in the operation menu U-2A, the process is transitioned to an operation menu U-2B, and feeding and reading of a panoramic photograph start.

In the operation menu U-2B, a guide of "reading" is displayed, and the "start" and "cancel" icons are set to be not selectable. When "stop" is selected in the operation menu U-2B, reading is stopped, and the process returns to the operation menu U-2A. When the reading is finished without selecting "stop" in the operation menu U-2B, the process returns to the operation menu U-1.

Also, the "cancel" icon may be omitted in the operation menus U-2A and U-2B.

Also, in a case in which "panorama" is selected in the operation menu U-1, the controller 40 selects a table No. 1 of FIG. 6 as a feeding condition being applied when the original document P is fed. A feeding mode being realized by the feeding condition of the table No. 1 is set to a "second feeding mode".

Here, a threshold "for photograph" is applied to "double-feeding detecting threshold", and "ON" is selected as "double-feeding detection" so as to determine the double-feeding. "OFF" is selected as "one sheet of paper feeding mode", the plurality of original documents can be set, and the documents are sequentially fed from the lowest document among the plurality of set original documents.

"Separation" is selected in "separation mode", the separating roller 15 is set in the separation state, and the original document is separated.

Next, in a case in which "instant" is selected in the operation menu U-1 as illustrated in FIG. 9, the process is transitioned to an operation menu U-3A. In the operation menu U-3A, a guide of "Please set first sheet of original documents" is displayed, and two operation icons of "start" and "cancel" are displayed. When "cancel" is selected in the operation menu U-3A, the process returns to the operation menu U-1.

When "start" is selected in the operation menu U-3A, feeding and reading of the instant photograph start, and the process is transitioned to an operation menu U-3B.

At a timing when the operation menu U-3B is displayed, one sheet of instant photographs is finished to be read, the "start" icon is set to be not selectable, and a guide of "Please set one sheet of next original documents" is displayed.

When one sheet of next original documents is set in this state, a sensor which is not illustrated detects this setting, and feeding and reading are automatically performed. That is, the "start" icon is needed to be touched only once for the first one sheet, but after that, feeding and reading the documents are automatically performed by setting the original document P.

When "cancel" is selected in the operation menus U-3A and U-3B, the process returns to the operation menu U-1.

Also, the "cancel" icon may be omitted in the operation menus U-3A and U-3B.

Also, in a case in which "instant" is selected in the operation menu U-1, the controller 40 selects the table No. 2 of FIG. 6 as a feeding condition being applied when the original document is fed. A feeding mode being realized by the feeding condition of the table No. 2 is set to a "first feeding mode".

Here, "OFF" is selected as "double-feeding detection", and "ON" is selected as "one sheet of paper feeding mode" without determining the double-feeding. "Non-separation"

is selected in "separation mode", the separating roller 15 is set in the non-separation state, and the original document is not separated.

Also, in a case in which "document" is selected in an operation menu (not illustrated) before being transitioned to the operation menu U-1, the controller 40 selects a table No. 4 of FIG. 6 as a feeding condition being applied when the original document P is fed.

Here, a threshold "for document" is applied to "double-feeding detecting threshold", "ON" is selected as "double-feeding detection" so as to determine the double-feeding. "OFF" is selected as "one sheet of paper feeding mode", the plurality of original documents P can be set, and the documents are sequentially fed from the lowest document among the plurality of set original documents P. "Separation" is selected in "Separation mode", and the separating roller 15 is set in the separation state so as to separate the original document.

A UI illustrated in FIGS. 7 to 9 can be changed as illustrated in FIGS. 10 and 11. In the operation menu U-2 illustrated in FIGS. 10 and 11, it is a type for selecting the types of the original document by a so-called radio button, and when the "start" icon is selected, feeding and reading of the original documents P, which are selected by the radio button, start. In a case of "normal photograph" (and in a case of "panoramic photograph"), a guide of "Please set original document" is displayed, and when the "start" icon is selected, the feeding and reading of the original document P start, and the process is transitioned to an operation menu U-4A.

In the operation menu U-4A, a "stop" icon is displayed. In a case in which reading is finished, or in a case in which the "stop" icon is selected, the process returns to the operation menu U-2.

Even in a case in which "panorama" is selected, the same menu transition as "normal photograph" occurs.

Meanwhile, in a case in which "instant" is selected, as illustrated in FIG. 11, a guide of "Please set first sheet of original documents" is displayed. A user sets the original document P one by one, and when a "start" icon is selected, feeding and reading of the instant photograph start, and the process is transitioned to an operation menu U-5C.

At the timing of displaying the operation menu U-5C, the first sheet of the instant photographs is finished to be read, and a guide of "Please set one sheet of next original documents" is displayed.

When one sheet of next original documents P is set in this state, a sensor which is not illustrated detects this setting, and feeding and reading are automatically performed. That is, after the second sheet, the feeding and reading are automatically performed by setting the original documents P.

When "cancel" is selected in the operation menu U-5C, the process returns to the operation menu U-2.

Also, a feeding setting, when each type of the original document is selected and the original document P is fed, follows the contents of FIG. 6 in the same manner as the example described above.

Also, regarding a display of "cancel", a specific content such as "exit instant mode and return to photograph select" may be displayed.

Characteristics of the scanner 1 described above are summarized as follows. That is, the scanner 1 includes the reading unit 20 reading the original document P, the original document placing portion 11 on which the original document P is placed, the feeding roller 14 feeding the original document P from the original document placing portion 11, the separating roller 15 which is a roller nipping the original document P between the feeding roller 14 and the separating roller and is capable of switching between the separation state of separating the original document P and the non-separation state of not separating the original document P, and the controller 40 controlling feeding of the original document P. Also, the controller 40 determines whether or not the original document is fed in the separation state or the non-separation state, based on the types of the original document P which are set through the user interface (FIGS. 7 to 11) for instructing a select of the types of the original document P to be read and a start of reading the original document.

The control program 44 (FIG. 4) includes a process of determining whether or not the original document is fed in the separation state or the non-separation state, based on the types of the original document P which are set through the user interface (FIGS. 7 to 11) for instructing a select of the types of the original document P to be read and a start of reading the original document.

Therefore, an appropriate separation state is reliably selected according to the types of the original document P, and thereby making it possible to appropriately feed the original document P. In addition, since the user does not need to select (does not have to be conscious) the separation state and the non-separation state of the separating roller 15 because the user only instructs the select of the types of the original document P to be read and the start of reading the original document through the user interface, and therefore, the apparatus is user-friendly and is capable of avoiding a setting mistake occurred by the user.

In addition, the scanner 1 includes the separation switching unit 68A (FIGS. 4 and 5) that switches between the separation state and the non-separation state of the separating roller 15 under the control of the controller 40, and the controller 40 controls the separation switching unit 68A based on the types of the set original document P. Therefore, since switching between the separation state and the non-separation state is automatically performed regardless of touching of the user, a user operability is improved, and reliability of appropriate feeding is secured.

In addition, the scanner 1 includes the double-feeding detecting portion 33 detecting double-feeding of the original document P on the downstream side of the feeding roller 14, the controller 40 is capable of switching between a first feeding mode (table No. 2 of FIG. 6), in which an instant photograph which is an example of a first original document is fed, and a second feeding mode (table No. 1 of FIG. 6), in which a panoramic photograph which is an example of a second original document is fed, the first feeding mode is a mode for feeding documents by setting a state of the separating roller 15 as the non-separation state, the second feeding mode is a mode for feeding the documents by setting the state of the separating roller 15 as the separation state, and the controller 40 does not use the double-feeding detecting portion 33 in first feeding mode but uses the double-feeding detecting portion 33 in the second feeding mode.

The original document P, which is fed when the separating roller 15 is set to the non-separation state, may be constituted by a plurality of layers, and thus if the double-feeding detecting portion 33 which detects the double-feeding of the original document P is used, there is a concern that double-feeding may be determined in spite of non double-feeding and a job may be stopped.

However, since the controller 40 does not use the double-feeding detecting portion 33 in the first feeding mode which is set in the non-separation state but uses the double-feeding detecting portion 33 in the second feeding mode which is set in the separation state, the concern described above can be avoided.

In addition, the first feeding mode (table No. 2 of FIG. 6) for feeding the instant photograph which is an example of the first original document is a feeding mode in which only one sheet of the original documents P set in the original document placing portion 11 is fed and a feeding standby state is set until a next one sheet of the original documents P is set, and the second feeding mode (table No. 1 of FIG. 6) for feeding the panoramic photograph which is an example of the second original document is a feeding mode in which the plurality of original documents set in the original document placing portion 11 is separated by the separating roller 15 and is continuously fed.

Therefore, the original documents which are constituted by a plurality of layers and is damaged when being separated by the separating roller 15, that is, the instant photograph in the example described above can be appropriately fed.

The embodiments described above can be modified as follows.

(1) In the embodiment described above, the switching between the separation state and the non-separation state of the separating roller 15 is automatically performed regardless of the operation of the user under the control of the controller 40, but the switching between the separation state and the non-separation state may be performed by the operation of the user.

FIGS. 12 to 14 are views illustrating such embodiments, and a scanner 100 includes an operation unit (slide switch) 73c alongside the operation panel 7 on a front surface of the apparatus as illustrated in FIG. 12. The operation unit 73c is slidable in a right and left direction.

The operation unit 73c is formed to be integral with the gear engaging member 73B as illustrated in FIGS. 13 and 14, and the gear engaging member 73B integrally includes a gear engaging portion 73d formed in a shape in which the slide gear 72 is pinched.

With the configuration as described above, when the operation unit 73c is slid, the slide gear 72 is slidably displaced, switching between a separation state in which the slide gear 72 meshes with the driving gear 71 and a driving force is transmitted to the gear group 70 and a non-separation state in which the slide gear 72 is deviated from the driving gear 71 and the driving force is not transmitted to the gear group 70 is performed.

A separation switching unit 68B according to the embodiment includes the gear engaging member 73B as described above.

Also, a gear 24 is provided on the transmission shaft 22 in FIGS. 13 and 14, and a driving torque is transmitted to the separating roller 15 from the gear 24 through the gear 23. A reference number 21 indicates a separating roller unit including the separating roller 15, and a reference number 25 indicates a coil spring as an energizing unit which energizes the separating roller unit 21 toward the feeding roller 14.

A configuration including the separation switching unit 68B switching between the separation state and the non-separation state by the operation of the user in this way is provided with a detecting unit (not illustrated) detecting a position of the slide gear 72, and the controller 40 may generate an alert in a case in which the state of the separating roller 15 does not correspond to the types of the set original document P (is not appropriate for the feeding condition illustrated in FIG. 6). This alert may be displayed on, for example, the operation panel 7, or may be displayed on the displaying portion 62 (FIG. 4) included in the external computer 60 (FIG. 4). The alert can be generated as a message such as, more specifically, "please slide operation knob on front surface of apparatus toward opposite side" or the like.

Therefore, it is possible to urge a user to perform a correct operation and to perform feeding of the original document P.

(2) As illustrated in FIGS. 12 and 13, the configuration in which the separation switching unit 68B switching between the separation state and the non-separation state by the operation of the user is included is provided with a detecting unit (not illustrated) detecting a position of the slide gear 72, and the controller 40 may select a feeding mode (feeding condition) based on whether or not the position of the slide gear 72 is set in the separation state or the non-separation state. Therefore, it is possible to perform an appropriate feeding control based on the state of the separating roller 15.

(3) The control program, which includes a process of determining whether or not the documents are fed in the separation state or the non-separation state based on the types of the original document P set through the user interface (FIGS. 7 to 11) for instructing a select of the types of the original document P to be read and a start of reading, may be stored in a storage (not illustrated) of the external computer 60 (FIG. 4) connected to the scanner 1 and be executed by the external computer 60, and the user interface may be realized through the displaying portion 62 of the external computer 60 (FIG. 4).

This application is a continuation of U.S. patent application Ser. No. 16/143,140, filed Sep. 26, 2018, which claims priority to Japanese Patent Application No. 2017-186947, filed Sep. 27, 2017, the entire disclosures of which are expressly incorporated by reference herein.

What is claimed is:

1. An image reading apparatus comprising:
an apparatus main body that includes a lower portion and an upper portion that is attached to the lower portion and is configured to rotate so that a transport path is exposed, the transport path being formed between the upper portion and the lower portion for transporting an original document and being inclined obliquely downward;
a reader that reads the original document transported on the transport path;
an original document place that is provided at an upstream side of the reader in a transport direction and on a rear side of the apparatus main body and includes a placing surface on which the original document is placed, the placing surface being inclined obliquely downward;
a feeding roller that feeds the original document from the original document place to the reader;
a separating roller that works with the feeding roller to nip the original document between the feeding roller and the separating roller and is configured to switch between a separation state in which the original document is fed while the separating roller has a driving force that makes the separating roller rotate in a direction in which the original document is transported to the original document place so as to prevent a double-feeding and is applied from a motor that generates a driving power of the separating roller, and a non-separation state in which the original document is fed while the separating roller does not have the driving force applied from the motor such that the separating roller can be freely rotated by the feeding roller;
a controller that controls feeding of the original document; and a touch screen that displays a user interface configured to allow a user to select one of a plurality of icons, wherein:

based on receiving a first user input of selecting a first icon among the plurality of icons at the touch screen, the controller determines either that the original document is to be fed in the separation state, and based on receiving a second user input of selecting a second icon among the plurality of icons at the touch screen that is different from the first icon, the controller determines that the original document is to be fed in the non-separation state.

2. The image reading apparatus according to claim 1, wherein the motor powers the separating roller via a plurality of gears, and wherein the gears comprise a gear that is configured to switch between a first state in which the driving force is transmitted to the separating roller, and a second state in which the driving force is not transmitted to the separating roller, and wherein when the controller switches the gear in the first state, the separating roller is in the separation state, and when the controller switches the gear in the second state, the separating roller is in the non-separation state.

3. The image reading apparatus according to claim 2, further comprising:

an actuator that switches the gear between the first state and the second state, wherein the controller switches the gear by controlling the actuator.

4. The image reading apparatus according to claim 3, wherein the touch screen displays the plurality of icons on a menu, and wherein the controller determines either the original document is fed in the separation state or the non-separation state based on a user input.

5. The image reading apparatus according to claim 3, wherein the touch screen displays the first icon and the second icon on a menu, wherein when the second icon is selected by the user, the controller determines to use a first feeding mode that is a mode in which a state of the separating roller is set to the non-separation state and the original document is fed, and wherein when the first icon is selected by the user, the controller determines to use a second feeding mode that is a mode in which a state of the separating roller is set to the separation state and the original document is fed.

6. The image reading apparatus according to claim 5, wherein the first feeding mode is a feeding mode in which only one original document set on the original document place is fed, and wherein the second feeding mode is a feeding mode in which a plurality of original documents set on the original document place is continuously fed.

7. The image reading apparatus according to claim 6, further comprising:

a double-feeding detector that is provided between the feeding roller and the reader in the transport direction and detects the double-feeding, wherein the controller does not use the double-feeding detector in the first feeding mode but uses the double-feeding detector in the second feeding mode.

8. The image reading apparatus according to claim 1, wherein each of the icons is corresponding to a feeding mode for a photograph, and wherein the controller determines the feeding mode based on the icon selected by the user.

9. The image reading apparatus according to claim 5, wherein the first feeding mode is corresponding to a feeding mode for a type of a photograph, and wherein the second feeding mode is corresponding to a feeding mode for another type of a photograph.

10. An image reading apparatus comprising:

an apparatus main body that includes a lower portion and an upper portion that is attached to the lower portion and is configured to rotate so that a transport path is exposed, the transport path being formed between the upper portion and the lower portion for transporting an original document and being inclined obliquely downward;

a reader that reads the original document transported on the transport path;

an original document place that is provided at an upstream side of the reader in a transport direction and on a rear side of the apparatus main body and includes a placing surface on which the original document is placed;

a feeding roller that feeds the original document from the original document place to the reader;

a separating roller that works with the feeding roller to nip the original document between the feeding roller and the separating roller and is configured to switch between a separation state in which the original document is fed while the separating roller has a driving force that makes the separating roller rotate in a direction in which the original document is transported to the original document place so as to prevent a double-feeding and is applied from a motor that generates a driving power of the separating roller, and a non-separation state in which the original document is fed while the separating roller does not have the driving force applied from the motor such that the separating roller can be freely rotated by the feeding roller;

a controller that controls feeding of the original document; and a touch screen that displays a user interface configured to allow a user to select one of a plurality of icons, wherein the motor powers the separating roller via a plurality of gears, wherein the gears comprise a gear that is configured to switch between a first state in which the driving force is transmitted to the separating roller, and a second state in which the driving force is not transmitted to the separating roller, wherein when the gear is in the first state, the separating roller is in the separation state, and when the gear is in the second state, the separating roller is in a non-separation state, wherein based on receiving a first user input of selecting a first icon among the plurality of icons at the touch screen, the controller determines that the original document is to be fed in the separation state, and wherein based on receiving a second user input of selecting a second icon among the plurality of icons at the touch screen that is different from the first icon, the controller determines that the original document is to be fed in the non-separation.

11. The image reading apparatus according to claim 10, further comprising:

a double-feeding detector that is provided between the feeding roller and the reader in the transport direction and detects the double-feeding of the original document, wherein the controller does not use the double-feeding detector in a first feeding mode that is a mode in which a state of the separating roller is set to the non-separation state and the original document is fed, but uses the double-feeding detector in a second feeding mode that is a mode in which a state of the separating roller is set to the separation state and the original document is fed.

12. The image reading apparatus according to claim 10, further comprising:
a detector that detects a position of the gear,
wherein the controller determines either the separating roller is in the separation state or the non-separation state based on a detection of the detector.

13. The image reading apparatus according to claim 12, wherein the controller determines a feeding mode based on the select of the user, and
wherein when the feeding mode is not corresponding to a state of the separating roller, the controller displays an alert on the touch screen.

14. The image reading apparatus according to claim 12, wherein the controller determines a feeding mode based on the detection of the detector, and
wherein when the feeding mode is not corresponding to a state of the separating roller, the controller displays an alert on the touch screen.

15. An image reading apparatus comprising:
an apparatus main body that includes a lower portion and an upper portion that is attached to the lower portion and is configured to rotate so that a transport path is exposed, the transport path being formed between the upper portion and the lower portion for transporting an original document and being inclined obliquely downward;
a reader that reads the original document transported on the transport path;
an original document place that is provided at an upstream side of the reader in a transport direction and on a rear side of the apparatus main body and includes a placing surface on which the original document is placed;
a feeding roller that feeds the original document from the original document place to the reader;
a separating roller that works with the feeding roller to nip the original document between the feeding roller and the separating roller and is configured to switch between a separation state in which the original document is fed separately while the separating roller has a driving force that makes the separating roller rotate in a direction in which the original document is transported to the original document place so as to prevent a double-feeding and is applied from a motor that generates a driving power of the separating roller, and a non-separation state in which the original document is not fed separately while the separating roller does not have the driving force applied from the motor such that the separating roller can be freely rotated by the feeding roller;
a controller that controls feeding of the original document; and
a double-feeding detector that is provided between the feeding roller and the reader in the transport direction and detects the double-feeding; and
a touch screen that displays a user interface configured to allow a user to select a first icon or a second icon on a menu,
wherein the motor powers the separating roller via a plurality of gears,
wherein the gears comprise a gear that is configured to switch between a first state in which the driving force is transmitted to the separating roller, and a second state in which the driving force is not transmitted to the separating roller,
wherein when the controller switches the gear in the first state, the separating roller is in the separation state, and when the controller switches the gear in the second state, the separating roller is in the non-separation state,
wherein based on receiving a first user input of selecting the first icon at the touch screen, the controller determines to use a first feeding mode that is a mode in which a state of the separating roller is set to the non-separation state, and the controller does not use the double-feeding detector when the original document is fed, and
wherein based on receiving a second user input of selecting the second icon at the touch screen, the controller determines to use a second feeding mode that is a mode in which a state of the separating roller is set to the separation state, and the controller uses the double-feeding detector when the original document is fed.

16. The image reading apparatus according to claim 15, wherein the controller is configured to switch between a first threshold and a second threshold for determining whether the double-feeding occurs or not,
wherein when the second icon is selected by the user, the controller determines to use the second feeding mode and sets the first threshold.

17. The image reading apparatus according to claim 15, wherein the first feeding mode is a feeding mode in which only one original document set on the original document place is fed, and
wherein the second feeding mode is a feeding mode in which a plurality of original documents set on the original document place is continuously fed.

18. The image reading apparatus according to claim 15, wherein the touch screen displays a third icon on the menu, and
wherein when the third icon is selected by the user, the controller determines to use the second feeding mode.

19. The image reading apparatus according to claim 1, wherein when the controller receives the first user input of selecting the first icon among the plurality of icons at the touch screen and a next user input indicating starting to feed the original document, the controller causes the feeding roller and the separating roller to work together to nip the original document in the separation state, in which the driving force from the motor is applied onto the separating roller, and
when the controller receives the second user input of selecting the second icon among the plurality of icons at the touch screen and a next user input indicating starting to feed the original document, the controller causes the feeding roller and the separating roller to work together to nip the original document in the non-separation state, in which the driving force from the motor is not applied onto the separating roller.

20. The image reading apparatus according to claim 10, wherein when the controller receives the first user input of selecting the first icon among the plurality of icons at the touch screen and a next user input indicating starting to feed the original document, the controller:
causes the gear of the motor to be switched to the first state, and
causes the feeding roller and the separating roller to work together to nip the original document in the separation state, in which the driving force from the motor is applied onto the separating roller, and when the controller receives the second user input of selecting the second icon among the plurality of icons at the touch screen and a next user input indicating starting to feed the original document, the controller:

causes the gear of the motor to be switched to the second state, and causes the feeding roller and the separating roller to work together to nip the original document in the non-separation state, in which the driving force from the motor is not applied onto the separating roller.

\* \* \* \* \*